United States Patent [19]

Iwata et al.

[11] 3,982,972

[45] Sept. 28, 1976

[54] SEMIHARD MAGNETIC ALLOY AND A PROCESS FOR THE PRODUCTION THEREOF

[75] Inventors: Masao Iwata, Chichibu; Yoichi Ishijima, Konosu; Osamu Fujita, Kumagaya, all of Japan

[73] Assignee: Hitachi Metals, Ltd., Japan

[22] Filed: Mar. 21, 1975

[21] Appl. No.: 560,941

[52] U.S. Cl. ........................... 148/31.55; 75/126 H; 75/126 Q; 148/121; 148/142

[51] Int. Cl.$^2$ ...................... C04B 35/00; H01F 1/00

[58] Field of Search ...................... 75/126 H, 126 Q; 148/121, 31.55, 120, 135, 136, 142

[56] References Cited

UNITED STATES PATENTS

| | | | |
|---|---|---|---|
| 1,866,925 | 7/1932 | Cioffi | 148/120 |
| 3,806,336 | 4/1974 | Kaneko et al. | 148/31.55 |

FOREIGN PATENTS OR APPLICATIONS

| | | | |
|---|---|---|---|
| 45-13229 | 5/1970 | Japan | 75/126 H |

OTHER PUBLICATIONS

Bozorth, R; *Ferromagnetism;* New York, 1951, pp. 199–205 and 416.

*Primary Examiner*—Walter R. Satterfield
*Attorney, Agent, or Firm*—Craig & Antonelli

[57] ABSTRACT

The semihard magnetic alloy of the present invention consists essentially of, by weight, 17 to 45 % chromium, 3 to 14 % cobalt, 0.2 to 5 % silicon and balance substantially iron, preferably 23 to 35 % chromium, 6 to 12 % cobalt, 0.3 to 3 % silicon and balance substantially iron and has a residual magnetic flux density of 7,000 Gauss or more and a coersive force of 100 to 600 Oersted. Said alloy is produced by solution treating an alloy having the above indicated composition at a temperature of 650°C. to 1,300°C., preferably 850°C. to 1,085°C., and then either maintaining the solution-treated alloy at a temperature of not higher than 650°C. for a given period of time and repeatedly aging said alloy in multi-stage at gradually lowered temperatures, or cooling the solution-treated alloy continuously from a temperature of not higher than 700°C. down to at least 550°C. at a rate of not higher than 50°C. per hour.

13 Claims, 2 Drawing Figures

SEMIHARD MAGNETIC ALLOY AND A PROCESS FOR THE PRODUCTION THEREOF

Figure 1:
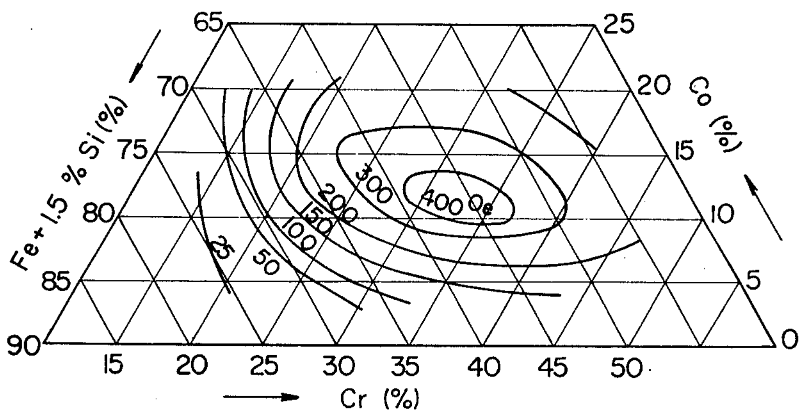

The present invention relates to a semihard magnetic alloy comprising iron, chromium, cobalt and silicon as main components, which has a good workability and is easy to heat treat, and to a process for the production thereof.

At present, semihard magnets are practically used mainly as hysteresis motors, hysteresis brakes and clutches, but magnetic properties required may vary broadly depending upon the nature of final uses. Therefore, there are too many kinds of semihard magnetic alloys having such magnetic properties. Practically, however, typical alloys are limited depending upon the degree of coersive force required. For example, where a coersive force (Hc) of 50 to 160 Oersted is required, Fe-Mn-Ti alloys, Fe-Co-V alloys or Alnico alloys are generally used. Further, where a coersive force (Hc) of 150 to 500 Oersted is required, Fe-Co-V alloys, Alnico alloys or Fe-Ni-Cu alloys are commercially used.

Of these alloys, ones having a particularly high coersive force (Hc) are used in great quantities as hysteresis brakes, clutches and various meters, and the demand of such alloys is rapidly increasing year by year. Thus, the quantities of semihard magnets used are also rapidly increasing. It is well known that Alnico can cover broad ranges of magnetic properties when compositions thereof are changed, but they are hard and brittle and, therefore, poor in workability.

Fe-Co-V alloys, i.e., so-called "Vicalloy" are famous as magnets having a good workability, but they have only one and great defect of being expensive because of containing more than 50% cobalt and more than 10% vanadium.

Fe-Ni-Cu alloys i.e., so-called "Cunife" have an excellent workability, and they can readily have a high coersive force, but can only have a relatively lower residual magnetic flux density. Therefore, their uses are limited.

The object of the present invention is to provide semihard magnetic alloys which are free of such defects as mentioned above and cheap, and have a good workability and excellent magnetic properties and further to provide a process for the production thereof. These alloys consist essentially of, by weight, 17 to 45% chromium, 3 to 14% cobalt, 0.2 to 5% silicon and balance substantially iron, and particularly the alloys consisting essentially of 23 to 35% chromium, 6 to 12% cobalt, 0.3 to 3 % silicon and balance substantially iron can have excellent magnetic properties. In view of these alloying components, these alloys exhibit a very excellent workability when, for example, forged, rolled, cut, punched or bent under both hot and cold conditions.

In order to give said alloys the best magnetic properties, the solution treatment and subsequent heat-aging are necessary. The solution treatment is necessary for obtaining uniform magnetic properties. The temperatures necessary for the solution treatment of the alloys having said compositions may range normally from 650°C. to 1,300°C., preferably from 850°C. to 1,085°C.

Further, the aging is necessary for subjecting the alloys rendered uniform by said solution treatment to the uniform precipitation or two-phase separation to produce the coersive force. The following two aging processes can be applied.

One process comprises maintaining the solution-treated alloys at a temperature of lower than 650°C. for a given period of time and then either cooling said alloys to room temperature in a usual manner (air cooling, water cooling, and etc.) or further maintaining said alloys at a lower temperature for another given period of time and repeating twice or more such maintaining stage (so-called "muli-stage aging process"), except that the maintaining temperature at each of the second and subsequent stages must be lower than that at the last stage.

The other process comprises continuously cooling the solution-treated alloys from a temperature of not higher than 700°C. In this process, the cooling rate is much lower than usual cooling rates during the cooling of said alloys to at least 550°C., i.e., a cooling rate of not higher than 50°C. per hour is selected. Further, the cooling may be set about at a temperature of from 700°C. to 580°C. Of course, said alloys are permitted to be maintained at the temperature at which the cooling is set about, for a given period of time. Said "muli-stage aging process" may be followed by the continuous cooling process.

The present invention is constituted by two main parts: one is an alloy composition capable of providing semihard magnetic properties and the other a process for affording said alloy composition excellent magnetic properties. The present invention will be explained detailedly below.

The alloy of the present invention is fundamentally a Fe-Cr-Co base alloy having silicon incorporated therein. The Fe-Cr-Co base alloy is well known as Spinodal alloy. Recently, it has been found that a Fe-Cr-Co base alloy having molybdenum or tungsten incorporated therein is usable as a permanent magnet. Such alloy is disclosed in U.S. Pat. No. 3,806,336. However, this alloy has excellent magnetic properties while, in view of the aspect of microstructure, the solution treatment must be made at a high temperature since at such high temperature a nonmagnetic austenite phase is stable and tends to remain at room temperature. Normally, a solution treating temperature of about 1,300°C. is required, but there is industrially considerable difficulty in solution treating at such temperature. Further, the melting should be conducted in vacuum or a non-oxidizing atmosphere and the fluidity of a melt is poor, because of the high chromium content. Thus, the improvements of the above defects are strongly desired.

The object of the present invention is to provide a semihard magnetic alloy being different from such magnetic alloy as mentioned above and having a relatively low coersive force. According to the present invention, it has been found that such defects as mentioned above can be removed by selecting the specified composition ranges of the main alloying components and adding an amount of silicon to the alloy.

In the alloy of the present invention chromium is one of the most essential components. If the chromium content is below 17%, the two-phase separation (or Spinodal dissociation), which is necessary to obtain semihard magnetic properties, does not take place. If the chromium content is above 45%, the $\sigma$ phase which has a conspicuously adverse influence on workability cannot be prevented from occurring. Thus, the alloy containing the chromium content in the range of 17 to 45% is satisfactory to semihard magnet, but in view of the aspect of magnetic properties, the chromium content in the range of 23 to 35% gives the best results.

Cobalt plays an important role in the two-phase separation in association with chromium while, in view of the aspect of microstructure, it has a close relation to the $\gamma$ phase. With respect to the two-phase separation, the lower limit of the cobalt content is 3%. If the cobalt content is below 3%, a coersive force of only 40 Oersted or less is obtained. The coersive force is predominantly increased with the cobalt content increased, but if the cobalt content exceeds 14%, the solution treatment becomes very difficult and, as a result, at industrially available solution treating temperatures of below 1,300°C. excellent magnetic properties are difficult to obtain. With respect to both the facts that the heat treatment can be easily carried out industrially and excellent magnetic properties can be obtained, the cobalt content in the range of 6 to 12% is preferred.

Silicon should be incorporated in an amount of not less than 0.2% into the alloy of the present invention. However, the silicon content exceeding 5% deteriorates the workability under hot and cold conditions. With respect to magnetic properties and workability, the optimum silicon content is in the range of 0.3 to 3%.

Carbon, magnesium and calcium from a furnace body and raw materials, and manganese from deoxidizing agents are permitted to be incorporated as impurities into the alloy in amounts of up to 0.1% carbon and up to 1% calcium, magnesium and manganese. The incorporation of such impurities in the indicated amounts has no adverse influence on both the magnetic properties and workability.

The solution treatment is important for homogenizing the microstructure of the alloy to obtain uniform magnetic properties. As mentioned above, the addition of silicon serves to remarkably relieve the conditions of the solution treatment. That is, Fe-Cr-Co alloys free of silicon usually require rapid cooling such as water cooling from a temperature of higher than 1300°C., but when a small amount of silicon (not less than 0.2%) is added the high temperature area in which austenite is stable becomes very narrower. It has been experimentally confirmed that Fe-Cr-Co alloys having 0.5 to 1% silicon added thereto are possible to solution treat over an entire high temperature area. This is industrially very significant. Thus, the addition of silicon is greatly advantageous. However, the silicon content exceeding 5% clearly deteriorates the workability and has an adverse influence on magnetic properties, as mentioned above.

In order for the alloy of the present invention to exhibit the optimum magnetic properties, the aging subsequent to the solution treatment is necessary. The combination of the specified alloy composition and the heat treating conditions makes it possible to obtain the optimum magnetic properties.

According to the present invention, the aging is preferably carried out at a maintaining temperature of about 650°C. or less, but it may be carried out at a maintaining temperature of up to about 700°C. for a short period of time. However, aging the alloy at a temperature of higher than 700°C. and at a temperature between 650°C. and 700°C. for a long period of time does not only deteriorate magnetic properties, but also promotes the precipitation of the $\sigma$ phase which has an adverse influence on workability and, as a result, such aging brings about embrittlement of the alloy.

It has been found that the optimum aging conditions for the alloy of the present invention, under which conditions very excellent magnetic properties can be obtained, are:

1. a range between 650°C. and 500°C. is divided into at least two stages and the aging is carried out in a first section at a temperature from 650°C. down to 600°C. for 0.1 to 5 hours and then similar agings carried out at subsequent stages, each of which is at a temperature of 5° to 30°C. lower than that of the last stage, for 0.2 to 20 hours for each stage (muli-stage aging process); or 2. the aging is carried out by continuously cooling the alloy from a temperature of 700°C. to 580°C. down to at least 550°C. at a cooling rate of not higher than 50°C. per hour (continuous cooling process).

The continuous cooling process (2) above gives particulary good magnetic properties and can be readily carried out.

Figure 2:
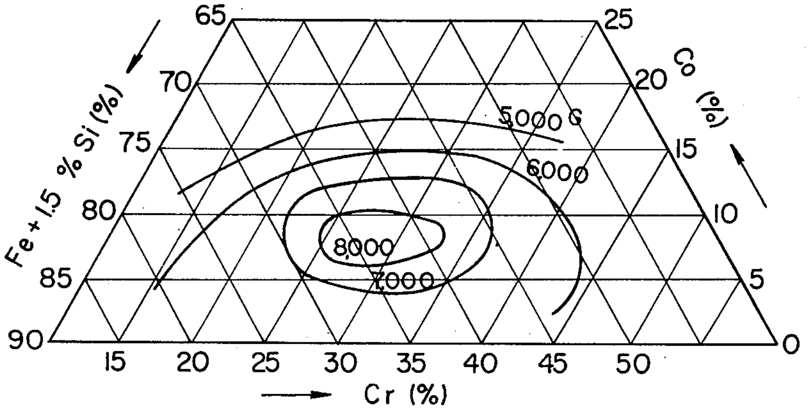

FIGS. 1 and 2 show the relations between the composition and the magnetic properties, particularly the coersive force (Hc) and the residual magnetic flux density (Br), respectively, under constant solution heating and aging conditions. That is, FIGS. 1 and 2 show changes of Hc and Br, respectively, with contour lines for alloys having a silicon content of 1.5% and various chromium and cobalt contents, which were solution treated at 1000°C. and then aged at 600°C. for 1 hour, at 580°C. for 3 hours, at 550°C. for 10 hours and further at 530°C. for 20 hours.

The following examples illustrate the present invention.

EXAMPLE 1

An alloy consisting essentially of 20.5% chromium, 4.8% cobalt, 0.85% silicon and balance iron at 1,200°C. was cooled in air and then aged at 630°C. for 1 hour, at 580°C. for 5 hours and further at 540°C. for 15 hours. A semihard magnetic alloy having a residual magnetic flux density (Br) of 7,800 Gauss and a coersive force (Hc) of 115 Oersted was thus obtained.

EXAMPLE 2

An alloy consisting essentially of 34.4% chromium, 10.2% cobalt, 1.96% silicon and balance iron at 1,000°C. was cooled in air and then aged at 630°C. for 1 hour, at 600°C. for 3 hours, at 570°C. for 10 hours and further at 540°C. for 20 hours. A semihard magnetic alloy having a residual magnetic flux density (Br) of 8,300 Gauss and a coersive force (Hc) of 396 Oersted was thus obtained.

EXAMPLE 3

An alloy having the same composition as used in Example 2 at 1,000°C. was cooled in air, heated to 630°C., cooled down to 500°C. at a rate of 40°C. per hour and then air cooled. Thus, excellent magnetic properties, namely, Br 8,410 Gauss and Hc 280 Oersted were obtained.

EXAMPLE 4

An alloy consisting essentially of 29.6% chromium, 8.7% cobalt, 1.47% silicon and balance iron at 900°C. was cooled in air and then aged at 630°C. for 15 hours. As a result, Br was 6,600 Gauss and Hc 120 Oersted. Further aging was carried out at 600°C. for 10 hours and then at 550°C. for 10 hours. As a result, Br was 8,400 Gauss and Hc 320 Oersted.

Another alloy having the same composition was maintained at 600°C. for 30 minutes and then continuously cooled down to 500°C. for 30 hours. Thus, Br was 8,700 Gauss and Hc 530 Oersted.

As mentioned above, according to the present invention, the alloys having the same magnetic properties as those of the Fe-Co-V alloys or Alnico alloys can be readily obtained, and they are inexpensive as compared with the Fe-Co-V alloys and have very good mechanical properties. Thus, the alloys of the present invention are practically excellent semihard magnetic alloys.

What is claimed is:

1. A heat-treated magnetic alloy having a residual magnetic flux density of 7,000 Gauss or more and a coersive force of 100 to 600 Oersted and consisting essentially of 17 to 45% by weight of chromium, 3 to 14% by weight of cobalt, 0.2 to 5% by weight of silicon and a balance of substantially iron.

2. The magnetic alloy according to claim 1 consisting essentially of 23 to 35% by weight chromium, 6 to 12% by weight cobalt, 0.3 to 3% by weight of silicon and a balance of substantially iron.

3. A process for producing a magnetic alloy having a residual magnetic flux of 7,000 Gauss or more and a coersive force of 100 to 600 Oersted which comprises solution-treating an alloy consisting essentially of 17 to 45% by weight chromium, 3 to 14% by weight cobalt, 0.2 to 5% by weight silicon and a balance of substantially iron, at a temperature of 650°C. to 1,300°C., maintaining the solution-treated alloy at a temperature of not higher than 600°C. for a given period of time and then repeatedly aging said alloy in a multi-stage sequence at gradually lowered temperatures selected to yield said magnetic alloy.

4. The process according to claim 3 wherein said alloy is solution-treated at a temperature from 850°C. to 1,085°C.

5. The process according to claim 3, wherein the alloy which is solution-treated consists essentially of 23 to 35% by weight of chromium, 6 to 12% by weight of cobalt, 0.3 to 3% by weight of silicon and a balance of substantially iron, to yield a magnetic alloy hving a residual flux density of 7,000 Gauss or more and a coersive force of 120 to 600 Oersted.

6. The process according to claim 5, wherein said alloy is solution-treated at a temperature of from 850° to 1,085°C and the resulting magnetic alloy has a magnetic flux density of 7,000 Gauss or more and a coersive force of 150 to 600 Oersted.

7. A process for producing a magnetic alloy having a residual magnetic flux density of 7,000 Gauss or more and a coersive force of 150 to 600 Oersted which comprises solution-treating an alloy consisting essentially of 17 to 45% by weight chromium, 3 to 14% by weight of cobalt, 0.2 to 5% by weight of silicon and a balance of substantially iron at a temperature of 650°C. to 1,300°C. and then cooling the solution-treated alloy continuously from a temperature of not higher than 700°C. down to at least 550°C. at a rate of not higher than 50°C. per hour selected to yield said magnetic alloy.

8. The process according to claim 7, wherein said alloy is solution-treated at a temperature of from 850°C. to 1,085°C.

9. The process according to claim 7, wherein the alloy which is solution-treated consists essentially of 23 to 35% by weight chromium, 6 to 12% by weight cobalt, 0.3 to 3% by weight silicon and a balance of substantially iron to yield a magnetic alloy having a residual magnetic flux density of 7,000 Gauss or more and a coersive force of 180 to 600 Oersted.

10. The process according to claim 9, wherein said alloy is solution-treated at a temperature of from 850°C. to 1,085°C.

11. A heat-treated magnetic alloy having a residual magnetic flux density of 7000 Gauss or more and a coersive force of 100 to 600 Oersted and consisting essentially of 17 to 45% by weight chromium, 3 to 14% by weight cobalt, 0.2 to 5% by weight of silicon, and a balance of iron and up to 0.1% by weight carbon and up to 1% by weight calcium, magnesium and manganese as impurities.

12. The process according to claim 3, wherein aging of said solution-treated alloy is effected in at least two stages, said aging being carried out in a first stage at a temperature from 650°C. down to 600°C. for 0.1 to 5 hours and then at subsequent stages each of which is at a temperature of 5° to 30°C. lower than that of the last preceding stage for 0.2 to 20 hours for each stage.

13. The process according to claim 7, wherein said solution-treated alloy is cooled from a temperature of 700°C. down to at least 550°C.

* * * * *